(12) United States Patent
Rapoport

(10) Patent No.: US 9,184,647 B2
(45) Date of Patent: Nov. 10, 2015

(54) HIGH EFFICIENCY HIGH OUTPUT DENSITY ELECTRICAL POWER GENERATOR

(76) Inventor: Uri Rapoport, Moshav Ben Shemen (IL)

( * ) Notice: Subject to any disclaimer, the term of this patent is extended or adjusted under 35 U.S.C. 154(b) by 511 days.

(21) Appl. No.: 13/495,702

(22) Filed: Jun. 13, 2012

(65) Prior Publication Data

US 2012/0319519 A1    Dec. 20, 2012

Related U.S. Application Data

(60) Provisional application No. 61/497,540, filed on Jun. 16, 2011.

(51) Int. Cl.
*H02K 1/27* (2006.01)
*H02K 21/24* (2006.01)
*H02K 19/08* (2006.01)
*H02K 21/12* (2006.01)
*H02K 23/54* (2006.01)

(52) U.S. Cl.
CPC .............. *H02K 21/24* (2013.01); *H02K 1/2793* (2013.01); *H02K 19/08* (2013.01); *H02K 21/12* (2013.01); *H02K 23/54* (2013.01)

(58) Field of Classification Search
CPC ..... H02K 1/2793; H02K 19/08; H02K 21/12; H02K 21/24; H02K 2201/06; H02K 23/54
USPC ................... 310/156.12, 156.36, 156.37, 268
See application file for complete search history.

(56) References Cited

U.S. PATENT DOCUMENTS

| | | | |
|---|---|---|---|
| 3,112,464 A * | 11/1963 | Ratajski et al. | 338/32 H |
| 3,242,365 A * | 3/1966 | Kober | 310/268 |
| 3,879,622 A | 4/1975 | Ecklin | |
| 4,691,119 A | 9/1987 | McCabria | |
| 6,455,969 B1 * | 9/2002 | Chen | 310/114 |
| 6,741,002 B2 * | 5/2004 | Nishiyama et al. | 310/156.53 |
| 6,844,656 B1 * | 1/2005 | Larsen et al. | 310/268 |
| 7,218,025 B1 | 5/2007 | McDonald | |
| 7,808,142 B2 * | 10/2010 | Wise | 310/156.32 |
| 8,866,358 B2 * | 10/2014 | Rapoport | 310/113 |
| 8,878,373 B2 * | 11/2014 | Thoresen | 290/1 R |
| 9,000,647 B2 * | 4/2015 | Rapoport | 310/156.37 |
| 2006/0226725 A1 * | 10/2006 | Wise | 310/156.35 |
| 2007/0052312 A1 * | 3/2007 | Stanetskiy et al. | 310/152 |
| 2008/0088200 A1 * | 4/2008 | Ritchey | 310/268 |
| 2012/0319517 A1 * | 12/2012 | Rapoport | 310/113 |
| 2012/0319518 A1 * | 12/2012 | Rapoport | 310/156.12 |
| 2012/0319519 A1 * | 12/2012 | Rapoport | 310/156.36 |

OTHER PUBLICATIONS

Garcia et al., Energy-efficient standards for electric motors in Brazilian industry, Energy Policy, Jun. 2007, pp. 3424-3439, vol. 35, No. 6, Elsevier.

* cited by examiner

*Primary Examiner* — John K Kim

(57) ABSTRACT

An electrical power generator that increases both power generation efficiency and electrical power density. The generator includes: a plurality of disk surfaces; a plurality of stationary supports; and a rotating shaft affixed to each of the disk surfaces. Each disk surface is coupled to an array of magnets arranged as matching magnetic pairs on two adjacent disk surfaces so as to create a plurality of magnetic fields between the matching magnetic pairs. Each stationary support sustains an array of electromagnetic coils. Each coil is disposed in-between each of the matching magnetic pairs. Each rotating shaft rotates each of the matching magnetic pairs around the generator coils such that a time varying magnetic flux is provided and electrical power is generated in each of the generator coils.

5 Claims, 7 Drawing Sheets

HIGH EFFICIENCY HIGH OUTPUT DENSITY ELECTRICAL POWER GENERATOR

FIELD OF THE INVENTION

The present invention generally relates to electrical power generation by introducing a variable magnetic flux through a generator coil.

The present invention particularly relates to varying the magnetic flux by means of rotationally moving a plurality of magnets across a plurality of generator coils.

BACKGROUND OF THE INVENTION

From the early days of electric power generator equipment, the only way that has been considered to obtain the changing magnetic field has been the moving of coils of wire past magnets or magnets past coils. For many years electric power generator engineering focused on different configurations of moving of coils past magnets or magnets past coils. Since the idea has worked, however inefficiently, the way by which electricity was produced did not change for many years.

The rising cost of energy sources and environmental pollution concerns, caused by vast amount of fuel burning, motivated governments and industry to pay attention and prioritize enhancements in power generation efficiency. One of the pioneering efforts in improving generator efficiency was made by Ecklin in U.S. Pat. No. 3,879,622 enclosed herein by reference.

U.S. Pat. No. 3,879,622 discloses a permanent magnet motor in one embodiment utilizes a spring-biased reciprocating magnetizable member positioned between two permanent magnets. Magnetic shields in the form of rotatable shutters are located between each permanent magnet and the reciprocating member to alternately shield and expose the member to the magnetic field thereby producing reciprocating motion. A second embodiment utilizes a pair of reciprocating spring-biased permanent magnets with adjacent like magnetic poles separated by a magnetic shield which alternately exposes and shields the like poles from the repelling forces of their magnetic fields. In his SAG 6 generator idea, Ecklin is using a slightly different configuration from the configuration in this reference, in which both the magnets and the coil are stationary. By refraining from having to put most of the input power in moving heavy masses of coils or magnets the SAG6 generator is significantly more efficient.

A significant feature of an electrical generator is to have a configuration, which maximizes the power output of a given generator physical size. Mounting space constrains and easier handling capability demands generator configurations which minimize the physical size for a given power output.

U.S. Pat. No. 4,691,119 enclosed herein by reference discloses an AC power generating system includes an array of permanent magnet alternators. The stator windings of these alternators are electrically connected in series and the total output voltage of the alternator array is regulated by adjusting the relative angular positions of the stators to control the phase angle of the output voltage of each alternator. The alternators employ an inside-out design wherein a plurality of permanent magnets are positioned at circumferentially displaced locations on an internal surface of a nonmagnetic support structure to form the rotor. A stator having a core with longitudinal slots for receiving a stator winding is positioned within the rotor structure such that relative rotation between the stator and rotor induces a voltage in the stator winding.

U.S. Pat. No. 7,218,025 enclosed herein by reference discloses a rotational magnetic electrical generating device that produces an alternating electrical current generated by a central rotational magnetic cylinder with an inner cavity having a central fixed coil operated by a DC current providing a driving rotational force upon a plurality of embedded neodymium magnets within the inner cavity of the central rotational magnetic cylinder, the central rotational magnetic cylinder having an upper outer margin with an upper magnetic ring and a lower outer margin having a lower magnetic ring, the two magnetic rings suspending the central rotational magnetic cylinder between two fixed magnetic fields supported by a frame member, the central rotational magnetic cylinder further having an outer perimeter surface embedded with a plurality of neodymium alloy magnets equally sized and spaced apart, a lower surface embedded with a plurality of neodymium alloy magnets equally sized and spaced apart, and an upper surface embedded with a plurality of neodymium alloy magnets equally sized and spaced apart and an upper surface embedded with a plurality of neodymium alloy magnets equally sized and spaced apart. A plurality of alternate wound electrical stators are suspended above the upper surface below the lower surface and around the outer perimeter surface of the central rotational magnetic cylinder, supported by the frame member while insulated from the frame member, each electrical stator connected to external leads to transmit alternating current generated by the spinning central rotational magnetic cylinder, the entire device enclosed within a vacuum.

U.S. application Ser. No. 10/272,839 enclosed herein by reference discloses a flywheel motor/generator having a holder to maintain the permanent magnets in a circular array on the rotor. Unique aspects of the invention include the magnet shapes that are used, the liner/retainer configuration used to secure the magnets, and the construction of the rotor in the immediate vicinity of the magnets. The principal functions of the design are 1) managing stresses in the rotor and the magnets at high speed when centrifugal acceleration can exceed 100,000 g's, and 2) securing the magnets when the assembly is at rest when magnets that are not properly secured can reposition themselves in deleterious ways through mutual attraction or repulsion. Keying features are also provided on the ends of the magnets to aid in assembly of the rotor and to maintain the magnets in the proper orientation.

Hence there is still a long felt need for an efficient electric generator that maximizes the electrical power output for a give physical size.

SUMMARY OF THE INVENTION

Accordingly, it is a principal object of the invention to provide an electrical power generator adaptable to maximize power generation efficiency and power generation output per given physical size of the generator by being configured with powerful, distinct and uniform plurality of magnetic fields with high magnetic flux density and matching generator coils, utilizing most of the generator volume.

In accordance with a preferred embodiment of the present invention, it is the object of the invention to disclose An electrical power generator comprising:
(i) a plurality of surfaces with an array of magnets affixed to each surface.
(ii) a plurality of stationary generator coil arrays.
(iii) a rotating shaft affixed to the surfaces.

The plurality of surfaces are arranged to accommodate creating a plurality of magnetic fields between opposite pairs of the magnets located on any two adjacent surfaces.

Each of the generator coil arrays is located between any of said adjacent surfaces; the number, the size, the shape, and the arrangement of any of the generator coils are fully equivalent to the number, the size, the shape and the arrangement of the magnetic fields.

Electrical power is generated in each of said generator coils by a time varying magnetic flux created by moving said matching magnetic pairs across said generator coils when the shaft is rotating.

Wherein said generator is adaptable to maximizing power generation efficiency and density by being configured with the powerful, distinct and uniform plurality of magnetic fields and matching generator coils.

It is one object of the present invention to provide an electrical power generator adapted to increase both the (i) power generation efficiency; and, (ii) electrical power density. The electrical power generator comprising:
(i) a plurality of disk surfaces; each of which coupled to an array of magnets arranged as matching magnetic pairs on two adjacent disk surfaces so as to create a plurality of magnetic fields between said matching magnetic pairs;
(ii) a plurality of stationary support, each of which is sustaining an array of electromagnetic coils; each coil is disposed in-between each of said matching magnetic pairs; and,
(iii) a rotating shaft affixed to each of said disk surfaces, adapted to rotate each of said matching magnetic pairs across said generator coils such that a time varying magnetic flux is provided and electrical power is generated in each of said generator coils.

It is another object of the present invention to provide the electrical power as defined above, wherein said electrical power generator increases the power generation efficiency to about 90% according to IEC 60034-30.

It is another object of the present invention to provide the electrical power as defined above, wherein said electrical power generator increases the power generation efficiency to about 90% according to Edict 553/2005.

It is another object of the present invention to provide the electrical power as defined above, wherein the shape of said magnets are selected from a group consisting of circular shape or polynomial shape.

It is another object of the present invention to provide the electrical power as defined above, wherein said magnets are magnetic field sources made of a rare earth material selected from a group consisting of samarium or neodymium.

It is another object of the present invention to provide the electrical power as defined above, wherein said pairs of magnetic field sources are facing each other with opposite magnetic poles.

It is another object of the present invention to provide the electrical power as defined above, wherein said pairs magnetic field sources are facing each other with same magnetic poles.

It is another object of the present invention to provide the electrical power as defined above, wherein said magnets are iron parts.

It is another object of the present invention to provide the electrical power as defined above, wherein said pairs of magnets are offset disposed.

It is another object of the present invention to provide the electrical power as defined above, comprising reversibly wound coils arranged in the array for optimizing generator efficiency.

It is another object of the present invention to provide the electrical power as defined above, wherein said coil disposed within said stationary support is tilted in an angle A with respect to said disk surface.

It is another object of the present invention to provide the electrical power as defined above, wherein forces exerted on said tilted coil have horizontal and vertical component.

It is another object of the present invention to provide the electrical power as defined above, wherein said horizontal forces can be used to rotate the magnets around said shaft when voltage is applied to the generator coil, thus turn said generator into a motor. It is another object of the present invention to provide the electrical power as defined above, wherein said generator coil comprising several conductor winding on a ferromagnetic material core.

It is another object of the present invention to provide the electrical power as defined above, wherein said generator coil size and shape fits the size and shape of said magnetic fields created between said pairs of magnets.

It is another object of the present invention to provide the electrical power as defined above, wherein said electrical power generator is configured so as to minimize air gaps between magnets and generator coils and hence reduce losses.

It is another object of the present invention to provide the electrical power as defined above, wherein said magnetic fields between each of said matching magnetic pairs are distinct and separate by said surface having a non magnetic layer.

It is another object of the present invention to provide the electrical power as defined above, wherein said array is mounted on a disk surface.

It is another object of the present invention to provide the electrical power as defined above, wherein all the magnets on a disk have the same magnetic pole orientation.

It is another object of the present invention to provide the electrical power as defined above, wherein said matching magnetic pairs have opposite pole orientation for creating a magnetic field between them.

It is another object of the present invention to provide the electrical power as defined above, wherein top surface of top disk and bottom surface of bottom disk contact the iron walls of the generator package to provide a low loss medium path to the magnetic field.

It is another object of the present invention to provide the electrical power as defined above, wherein the arrangement of magnets on two adjacent radial lines is staggered.

It is another object of the present invention to provide the electrical power as defined above, wherein said magnets are arranged on curved lines from the center of said disk out to the edge of said disk.

It is another object of the present invention to provide the electrical power as defined above, wherein said magnets are arranged on a spiraled line from the center of said disk out to the edge of said disk.

It is another object of the present invention to provide the electrical power as defined above, wherein said generator is configured as a ball structure and comprising a first surface located on the inside of a first ball and a second surface located on the outside surface of a second ball located within said first ball.

It is another object of the present invention to provide the electrical power as defined above, wherein said generator is configured as an ellipsoid structure and comprising a first surface located on the inside of a first ellipsoid and a second surface located on the outside surface of a second ellipsoid located within said first ellipsoid.

It is another object of the present invention to provide the electrical power as defined above, additionally comprising a first surface wave shaped located inside and a second wave shaped surface located on the outside.

It is another object of the present invention to provide the electrical power as defined above, wherein said first surface and said second surface are contacting said rotating shaft made of iron to provide a low loss medium path for the closing magnetic fields.

It is another object of the present invention to provide the electrical power as defined above, wherein each said stationary generator coils is placed in a direction defined by the magnetic field created between a pair of magnetic devices.

It is another object of the present invention to provide the electrical power as defined above, wherein said generator coils have the size and shape defined the magnetic fields.

It is another object of the present invention to provide the electrical power as defined above, wherein said magnets placed on said two surfaces are equal in size and said generator coil is shaped cylindrically as the magnetic field.

It is another object of the present invention to provide the electrical power as defined above, wherein said generator coils are shaped conically like said magnetic field created by bigger magnets placed on the bigger first surface and smaller magnets placed on said second smaller surface.

It is another object of the present invention to provide a method for generating electrical power whilst increasing both the power generation efficiency and the electrical power density. The method comprising steps selected inter alia from:
 a. providing a plurality of disk surfaces;
 b. providing a plurality of arrays of magnets;
 c. coupling said arrays of magnets to each of said disk surfaces such that a matching magnetic pairs on two adjacent disk surfaces are obtained so as a plurality of magnetic fields between said matching magnetic pairs are created;
 d. positioning a plurality of generator coil arrays in-between each of said matching magnetic pairs;
 e. affixing a rotating shaft to said disk surfaces;
 f. rotating said rotating shaft such that said matching magnetic pairs are rotated;
 thereby generating electrical power in each of said generator coils by time varying magnetic flux whilst increasing both the power generation efficiency and the electrical power density.

It is another object of the present invention to provide the method as defined above, additionally comprising the step of selecting the shape of said magnets from a group consisting of circular shape or polynomial shape.

It is another object of the present invention to provide the method as defined above, additionally comprising the step of providing said magnets from magnetic field sources made of rare earth material selected from a group consisting of samarium or neodymium.

It is another object of the present invention to provide the method as defined above, additionally comprising the step of adjusting said pairs of magnetic field sources to face each other with opposite magnetic poles.

It is another object of the present invention to provide the method as defined above, additionally comprising the step of adjusting said pairs of magnetic field sources to face each other with same magnetic poles.

It is another object of the present invention to provide the method as defined above, additionally comprising the step of selecting said magnets from iron parts.

It is another object of the present invention to provide the method as defined above, additionally comprising the step of offset disposing said pairs of magnetic devices.

It is another object of the present invention to provide the method as defined above, additionally comprising the step of positioning reversibly wound coils in an array for optimizing generator efficiency.

It is another object of the present invention to provide the method as defined above, additionally comprising the step of positioning said coil within the volume of offset magnets is tilted in an angle.

It is another object of the present invention to provide the method as defined above, additionally comprising the step of selecting a generator coil comprising several conductor winding on a ferromagnetic material core.

It is another object of the present invention to provide the method as defined above, additionally comprising the step of fitting the size and shape of said generator coil to the size and shape of said magnetic fields created between said pairs of magnets.

It is another object of the present invention to provide the method as defined above, additionally comprising the step of configuring said electrical power generator so as to minimize air gaps between magnets and generator coils and hence reduce losses.

It is another object of the present invention to provide the method as defined above, additionally comprising the step of distinguishing and separating said magnetic fields between each of said matching magnetic pairs by said disk surface having a non magnetic layer.

It is another object of the present invention to provide the method as defined above, additionally comprising the step of mounting said array on the surface of said disk.

It is another object of the present invention to provide the method as defined above, additionally comprising the step of adjusting all of said magnets on said disks to have the same magnetic pole orientation.

It is another object of the present invention to provide the method as defined above, additionally comprising the step of adjusting said matching magnetic pairs to have opposite pole orientation for creating a magnetic field between them.

It is another object of the present invention to provide the method as defined above, additionally comprising the step of contacting the top surface of the top disk and bottom surface of bottom disk with the iron walls of the generator package to provide a low loss medium path to the magnetic field.

It is another object of the present invention to provide the method as defined above, additionally comprising the step of arranging said magnets on curved lines from the center of said disk out to the edge of said disk.

It is another object of the present invention to provide the method as defined above, additionally comprising the step of arranging said magnets on a spiraled line from the center of said disk out to the edge of said disk.

It is another object of the present invention to provide the method as defined above, additionally comprising the step of configuring said generator as a ball structure.

It is another object of the present invention to provide the method as defined above, additionally comprising the step of configuring said generator as an ellipsoid structure.

It is another object of the present invention to provide the method as defined above, additionally comprising the step of contacting said first surface and said second surface with said rotating shaft to provide a low loss medium path for the closing magnetic fields.

It is another object of the present invention to provide the method as defined above, additionally comprising the step of placing each of said stationary generator coils in a direction defined by the magnetic field created between a pair of magnets.

It is another object of the present invention to provide the method as defined above, additionally comprising the step of configuring said generator coils to have the size and shape as defined by the magnetic fields.

It is still an object of the present invention to provide the method as defined above, additionally comprising the step of increasing the power generation efficiency by said electrical power generator to about 90% according to IEC 60034-30.

It is lastly an object of the present invention to provide the method as defined above, additionally comprising the step of increasing the power generation efficiency by said electrical power generator to about 90% according to Edict 553/2005.

BRIEF DESCRIPTION OF FIGURES

For a better understanding of the invention with regard to embodiments thereof, reference is made to the accompanying drawings, in which the numerals designate corresponding elements in sections throughout and in which:

FIG. 4a illustrates a non-dimensionally scaled cross-sectional view of two adjacent surfaces including four different pairs of different devices facing each other;

DETAILED DESCRIPTION OF THE PREFERRED EMBODIMENTS

Figure 1:
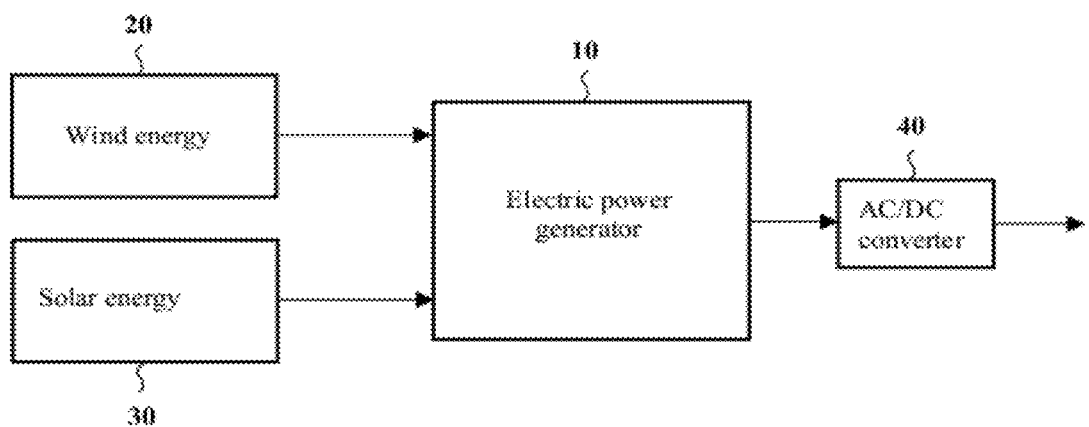
FIG. 1 illustrates a block diagram of a system converting wind and solar energy into electrical power according to an embodiment of the present invention.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide an electrical power generator.

In the following detailed description, numerous specific details are set forth in order to provide a thorough understanding of embodiments of the present invention. However, those skilled in the art will understand that such embodiments may be practiced without these specific details. Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments.

The drawings set forth the preferred embodiments of the present invention. The embodiments of the invention disclosed herein are the best modes contemplated by the inventors for carrying out their invention in a commercial environment, although it should be understood that various modifications are accomplished within the parameters of the present invention.

The term 'generator coil' refers hereinafter in a non-limiting manner to an element of the generator producing the electrical voltage output, which is commonly constructed by a plurality of conductor wires windings around a ferromagnetic core.

The term 'ferromagnetic core' refers hereinafter in a non-limiting manner to a material structure of substances such as iron, nickel, or cobalt and various alloys that exhibit extremely high magnetic permeability, a characteristic saturation point, and magnetic hysteresis.

The term 'diode bridge rectifier' refers hereinafter in a non-limiting manner a circuit using four diodes to provide full wave rectification to converts an AC voltage to a pulsating DC voltage.

The term 'permanent magnetic field source' refers hereinafter in a non-limiting manner to a device made of special material that produces a magnetic field for a long time all by itself.

The term 'magnetic device' or 'magnet' refers hereinafter in a non-limiting manner to a permanent magnetic field source or a matching iron part. A magnetic field is created between any pair of magnetic devices (i.e., magnets) facing each other.

The term 'non magnetic material' refers hereinafter in a non-limiting manner to materials having the magnetic fields of the individual atoms randomly aligned and thus tend to cancel out.

The term 'brushless generator' refers hereinafter in a non-limiting manner to a generator that does not use brushes that make contact with the generator terminals for commutating the voltage outputs for converting the AC voltage into a DC voltage output.

The term 'magnetic flux' refers hereinafter in a non-limiting manner to a measure of the strength of a magnetic field over a given area, graphically presented by the lines of force surrounding a permanent magnet.

The term 'magnetic flux density' refers hereinafter in a non-limiting manner to the amount of magnetic flux through a unit area taken perpendicular to the direction of the magnetic flux.

The term 'high density power generation' refers hereinafter in a non-limiting manner to providing electrical power per physical size higher than about 90%.

The term "about" refers hereinafter to a range of 25% below or above the referred value.

The term "International Electrotechnical Commission (IEC) 60034-30" refers hereinafter to a new standard developed by the IEC. 'IEC 60034-30, Efficiency Classes of single-speed three-phase cage induction motors'. The aim of this standard is to provide a globally harmonized set of performance labels categorizing energy efficiency classes of single-speed three-phase cage induction motors. The scope of motors considered will be 3 phase cage induction motors at 50 Hz or 60 Hz that:

have a rated power between 0.75 kW and 200 kW
have a rated voltage of up to 1000 V
be rated for continuous duty—S1
be protection rated IP4$x$ or higher The term "Edict 553/2005" refers hereinafter to an updated regulation, from the end of 2005. The first regulation of the "Energy Efficient Act" for electric motors, launched in 2002, established two sets of minimum efficiency performance standards (MEPS), for 'standard' (mandatory) and 'high efficiency' (voluntary) motors (see Agenor Gomes Pinto Garciaa, Alexandre S. Szkloa, Roberto Schaeffera and Michael A. McNeilb, "Energy-efficiency standards for electric motors in Brazilian industry", Energy Policy, Volume 35, Issue 6, June 2007, Pages 3424-3439).

The present invention accommodates electric power generation by varying magnetic flux through a plurality of generator coils via rapidly alternating a magnetic flux across stationary coils. The rapidly alternating magnetic field is created by a plurality of matching magnetic pairs, which are affixed to and displaced by a rotating shaft. A plurality of magnets arranged in pairs, create a powerful uniform magnetic flux density between each magnet pair and the magnetic field created by each pair is distinct from the magnetic field created by any other pairs of magnets. The physical size of each generator coil is compatible to the volume and shape of the magnetic field created between each pair of magnets (matching magnetic pairs). The number and arrangement of all the generator coils fits the number and arrangement of matching magnetic pairs. When the magnets are displaced by the shaft rotation, each generator coil repeatedly experiences time varying magnetic flux caused by the moving magnetic field of each of the matching magnetic pairs passing across the stationary generator coil. Consequently an electrical voltage is generated across each of the generator coils.

The configuration of powerful, distinct and uniform plurality of magnetic fields with high magnetic flux density and matching generator coils utilizing most of the generator volume is adaptable to maximizing power generation efficiency and power generation output per given physical size of the generator.

Reference is now made to FIG. 1, a block diagram of an electrical power generation system application converting wind energy and solar energy into electrical power. Wind energy 20 is applied to a rotor rotating mechanically the rotary portion of the electric power generator 10. Solar energy 30 is commonly converted to rotational force by heating a low boiling point liquid and utilizing the generated heat by using a heat exchanger to power a motor, which rotates the shaft of generator 10. Generator 10 generates electrical power by varying a magnetic flux through generator coils. The varying magnetic flux is created by the rotation of magnets across the stationary generator coil. Generator 10 commonly generates an alternating current (AC) output. An optional AC to direct current (DC) converter 40 converts the AC output of the generator into DC electrical output, via a commonly known diode bridge rectifier. The generator is brushless by using diode bridge rectifier to convert the generated AC voltage into a DC voltage rather than with a mechanical commutating device having brushes.

Figure 2:
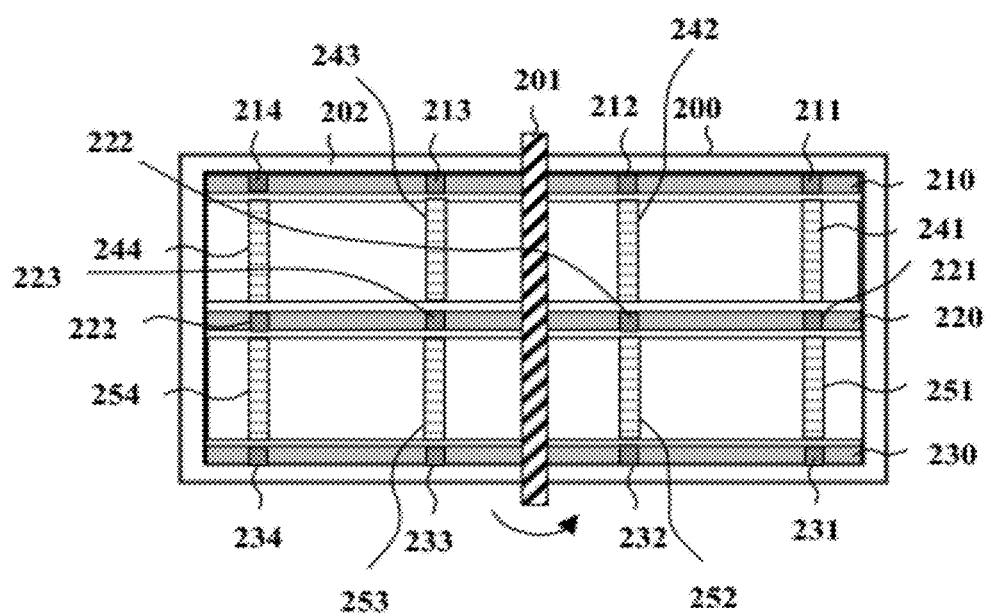
FIG. 2 illustrates a non-dimensionally scaled cross-sectional view of a generator that is cylindrically structured, according to an embodiment of the present invention.

Reference is now made to FIG. 2, a cross sectional view of a cylindrical structure embodiment of the electrical generator 200. The generator includes top disk 210, middle disk 220 and bottom disk 230. Magnets 211, 212, 213 and 214 affixed to the bottom side of disk 210 represent a plurality of magnets arranged in a dense array on the entire bottom surface of disk 210. Likewise magnets 221, 222, 223 and 224 mounted on disk 220 are representing a dense array of magnets. Magnets 211 and 221 are located opposite to each other and constitute a pair (matching magnetic pairs) creating a uniform magnetic field between them. Likewise, all the magnets on disk 210 have mating magnets on disk 220 configured as matching magnetic pairs having magnetic fields between them. A layer of non-magnetic material magnetically insulates the magnets on the disk surfaces from each other. Consequently, a plurality of uniform and distinct magnetic fields exists between opposite magnets on disk 210 and 220. Magnets 231, 232, 233 and 234 mounted on disk 230 representing a dense array of magnets. Magnets 231 and 221 are located opposite to each other constitute a matching magnetic pairs creating a uniform magnetic field between them. Likewise all the magnets on disk 230 have corresponding magnets on disk 220. The magnets on the disk surfaces are magnetically insulated from each other by a layer of non magnetic material, consequently a plurality of uniform and distinct magnetic fields exist between opposite magnets on disk 210 and 220.

The magnets may have a polygon or circular shape and is either a magnetic field source, commonly fabricated from a rare earth material as samarium, neodymium or a part made of iron. Generator coils 241, 242, 243 and 244 placed in the volume enclosed between disk 210 and disk 220 represent a plurality of generator coils numbering like the matching magnetic pairs and arranged spatially like the magnetic fields. Likewise, generator coils 251, 252, 253 and 254 placed in the volume enclosed between disk 220 and disk 230, represent a plurality of generator coils numbering like the matching magnetic pairs and arranged spatially like the magnetic fields.

It should be pointed that the number, the size, the shape, and the arrangement of any of the generator coils are fully equivalent to the number, the size, the shape and the arrangement of the magnetic fields.

Disks 210, 220 and 230 affixed to shaft 201 are rotating (and hence the entire magnetic device as well) when the shaft is rotating. The rotation of all the magnets affixed to the disks creates a time-varying magnetic flux through each of the generator coils and generate an AC voltage in each of the generator coils. The top of disk 210 and bottom of disk 230 are made of low magnetic loss metals contacting the iron wall of the generator package to minimize losses of the magnetic field lines. The generator structure is packaged within an ironed wall package with low magnetic losses, which are used to close the magnetic field lines while minimizing losses. The magnets within the matching magnetic pairs are either both permanent magnet sources with opposite or identical polarity, or include one permanent magnet source and one iron part. The gap between the matching magnetic pairs and the generator coils are minimized to minimize energy losses. The number of disks inside generator 200 can be varied in a non-limiting manner from a minimum of a top disk and a bottom disk to any practical number of disks when a power output increase is desired. High magnetic flux density created by a plurality of matching magnetic pairs, a dense structure of matching magnetic pairs and matching generator coils, minimal size of air gaps and minimal magnetic field losses are adaptable in this invention for providing high efficiency and high-density power generation.

Winding of electromagnetic coils can be made in two opposite directions creating opposite magnetic field directions and consequently opposite force vectors. In one embodiment the array of coils may include reversibly wound coils arranged by way of optimizing motor-generator efficiency.

Figure 3A:
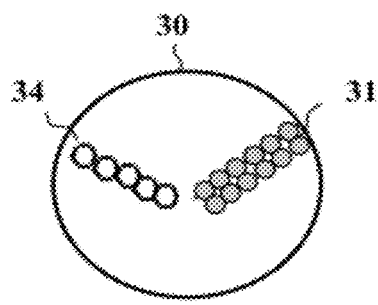
FIG. 3a illustrates a non-dimensionally scaled top view of a disk used for mounting an array of magnets by applying one arrangement of circular and hex shaped magnets according to an embodiment of the present invention.

Reference is now made to FIG. 3a, a top view of a disk 30 with a plurality of magnets 31 arranged on two adjacent radial lines and presenting a plurality of radial lines of magnets covering the entire surface of disk 30. The array of magnets on the entire disk surface is arranged densely on the entire disk surface. The surface of the disk is covered with a non magnetic material which isolates between the plurality of parallel magnetic fields generated between the individual magnets on the disk and the counter part corresponding magnets disposed on a second facing disk. Circular magnets 31 in this embodiment are arranged along two adjacent radial lines similarly. The magnets can have any polynomial shape. For example, hex shaped magnets 34, are depicted arranged along a radial line.

Figure 3B:
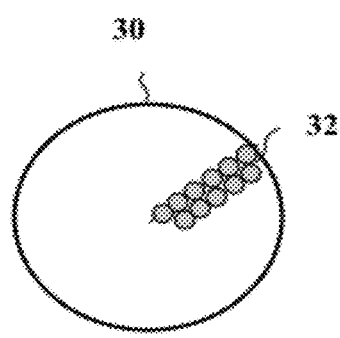
FIG. 3b illustrates a non-dimensionally scaled top view of a disk used for mounting an array of magnets by applying a second arrangement of magnets according to an embodiment of the present invention.

Reference is now made to FIG. 3b, a top view of a disk 30 with a plurality of magnets 32 arranged on two adjacent radial lines and presenting a plurality of radial lines of magnets covering the entire surface of disk 30. The array of magnets on the entire disk surface is arranged densely on the entire disk surface. The surface of the disk is covered with a non magnetic material which isolates between the plurality of parallel magnetic fields generated between the individual magnets on the disk and the counter part corresponding magnets disposed on a second disk facing this disk. The magnets 32 in this embodiment arranged along one radial line are staggered with respect to the ones arranged along an adjacent radial line.

Figure 3C:
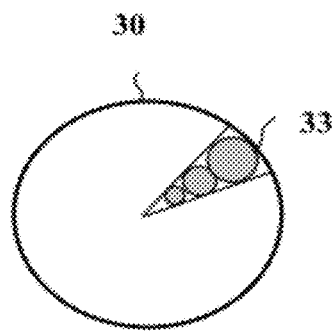
FIG. 3c illustrates a non-dimensionally scaled top view of a disk used for mounting an array of magnets, which are smaller near the center of the disk and gradually increase in size towards the disk edge according to an embodiment of the present invention.

Reference is now made to FIG. 3c, a top view of a disk 30 with a plurality of magnets 33 of sizes varying gradually in size along a radial line. The smallest magnet is located near the disk center and the larges is the one closest to the disk edge. Mounting various magnet is an embodiment that accommodates higher area utilization of the magnetic disks affixed to the disk.

The arrangement of the magnets array on a surface can take other forms too. In one embodiment the magnets array can be spiraled from the center to the edge of the disk. In another embodiment the magnets array can arranged along differently curved lines from the disk center out to the disk edge.

Reference is now made to FIG. 4a a cross sectional view of two adjacent disks having pairs of magnets facing each other affixed to them. Magnets 45a affixed to disk 40a and magnets 45b affixed to disk 40b, are pair of permanent field sources. Permanent magnetic source 45b has a north magnetic pole facing upward and permanent magnetic source 45a has a south magnetic pole facing downward. Consequently, the magnetic field between this pair creates an attraction force.

Magnets 44a and magnets 44b are permanent magnets facing each other with their common north poles. Consequently, the magnetic field between this pair creates a repletion force.

Magnets 43a are an iron part and magnets 43b are a permanent magnetic field source of any pole direction. A magnetic filed is generated between this pair of magnets by the iron part 43a being magnetized by the permanent magnetic field source 43b.

Magnets 42a are a permanent magnetic field source and magnets 42b are a part of iron. Thus this matching magnetic pairs is arranged opposite to the matching magnetic pairs 43a and 43b.

An optimum design of different matching magnetic pairs combinations affixed to the disks' surfaces leads to preferred system performance.

Figure 4C:
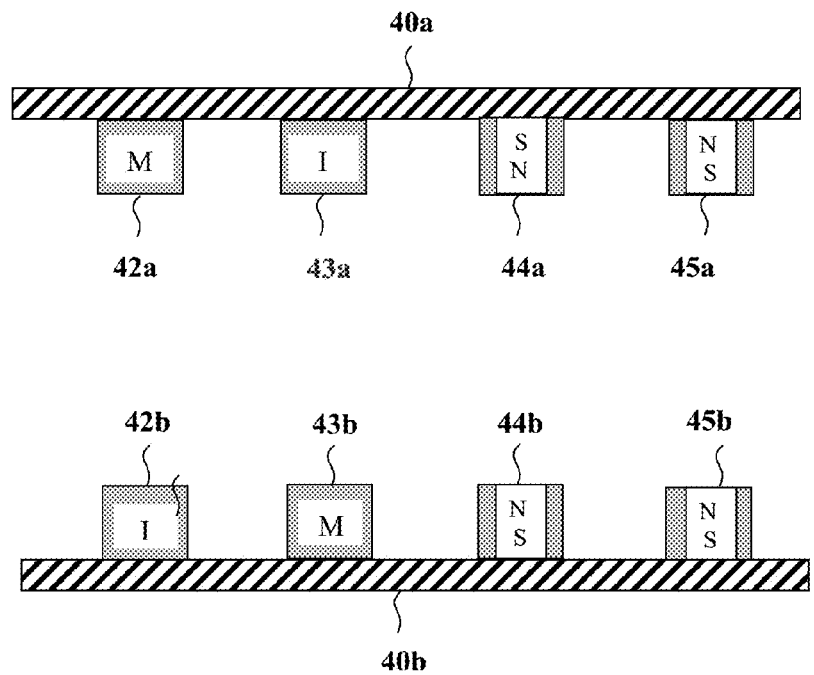
FIG. 4c illustrates a top view of a disk surface having an array of magnets arranged along curved lines from the center to the edge.
Figure 4C:
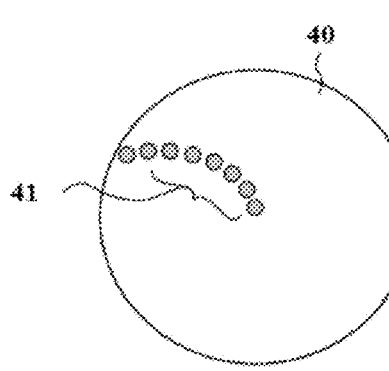
Figure 4D:
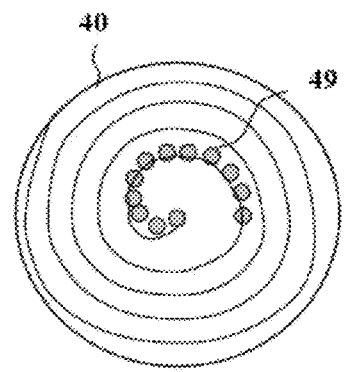
FIG. 4d illustrates a top view of a disk surface having an array of magnets along a spiraled line from the center to the edge.
Figure 4B:
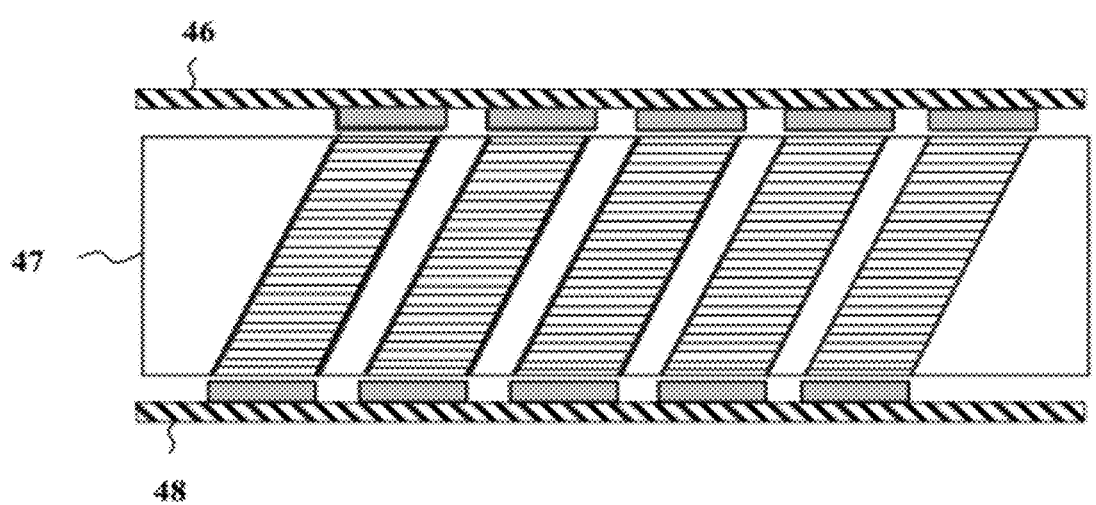
FIG. 4b illustrates a non-dimensionally scaled cross-sectional view of two adjacent surfaces affixed with arrays of magnets arranged as tilted pairs and generator coils tilted between each pair of devices.

Reference is now made to FIG. 4b a non-dimensionally scaled cross sectional view of adjacent surfaces affixed with arrays of magnets arranged in pairs. The magnets affixed to disk 46 and the magnets of disk 48 are offset to each other. Consequently, the magnetic flux between matching magnetic pairs are tilted by an arbitrary angle with respect to the disk planes and the coils between each pair, are tilted by the same angle. Tilted coils supported by structure 47 and magnetic fields have tilted force vectors when voltage is applied to the coils. The horizontal component of the force vector exerts a rotational force on the rotor. Consequently, the configuration of tilted magnetic fields and coils can be used as a motor when voltage is applied to the coils.

Reference is now made to FIG. 4c. which is a top view of a disk 40, showing an array of magnets arranged along a curved line 41 from the disk center to the disk edge, rather than along straight radial line, as in FIGS. 3.

Reference is now made to FIG. 4d, which is a top view of a disk 40, showing an array of magnets arranged along a spiral 49 starting at the disk center and extending all the way to the disk edge.

Figure 5A:
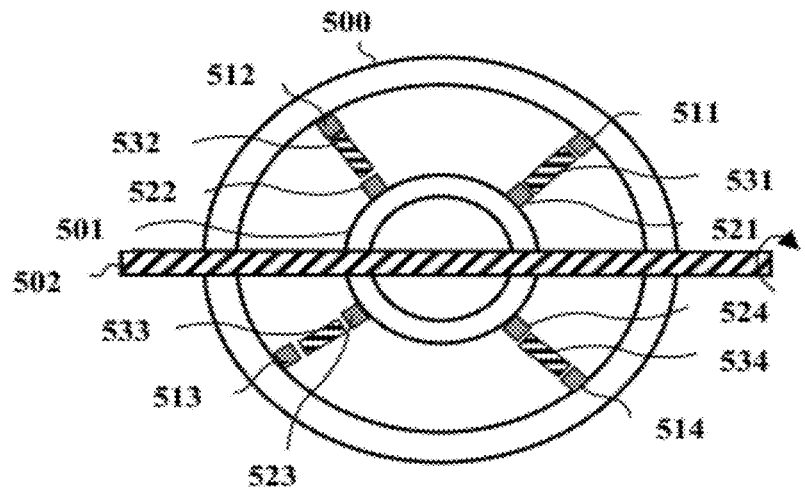
FIG. 5a illustrates a non-dimensionally scaled cross-sectional view of a small ball structure disposed within a bigger ball moving around the same rotational shaft by accommodating a first configuration of magnetic and generator coil arrays according to an embodiment of the present invention.

Reference is now made to FIG. 5a, a cross sectional view of a generator employing a ball structure. The embodiment accommodates an outer ball 500 for a first magnets array and an inner ball 501 for a second magnets array. The magnets 511, 512, 513 and 514, which are affixed to the inner surface of ball 500, represent an array of plurality of magnets on the entire inner surface of ball 500. The magnets 521, 522, 523 and 524, which are affixed to the outer surface of ball 501, disposed within the volume of ball 500, likewise represent an array of magnets on the entire outer surface of ball 501. Each magnets on the inner surface of ball 500 mates with a corresponding magnet on the outer surface of ball 501 and produces a cylindrically shaped powerful uniform magnetic field. Thus a plurality of uniform magnetic fields are directed radialy inside the volume of ball 500 and external to ball 501. A non-magnetic material covering inner surface of ball 500 and outer surface of ball 501 isolate the plurality of magnetic fields from each other and minimize losses caused by magnetic field leakage. Generator coils 531, 532, 533 and 534 are mounted inside the volume of ball 500 external to ball 501. Each generator coil has the size and the shape of the magnetic fields created inside that volume. The number of coils equals the number of matching magnetic pairs and they are arranged radially like the magnetic fields created between the matching magnetic pairs. The generator coils are generating electrical power when a time varying magnetic flux is applied to them. The magnetic flux applied to the generator coils is time varying when ball 500 and ball 501 rotate around shaft 502.

Consequently a plurality of magnetic fields, cross the stationary array of generator coils and voltage is generated in each of the coils. Ball 500 and ball 501 which are constructed from a low magnetic loss material are contacting shaft 502 made of iron or another low magnetic loss material used together to close the magnetic field loop. A low magnetic field loss is also incorporated by small air gaps between each generator coil and the pair of magnets. The configuration incorporates high power generation efficiency due to low losses along with high power density due to effective utilization of the generator volume.

Figure 5B:
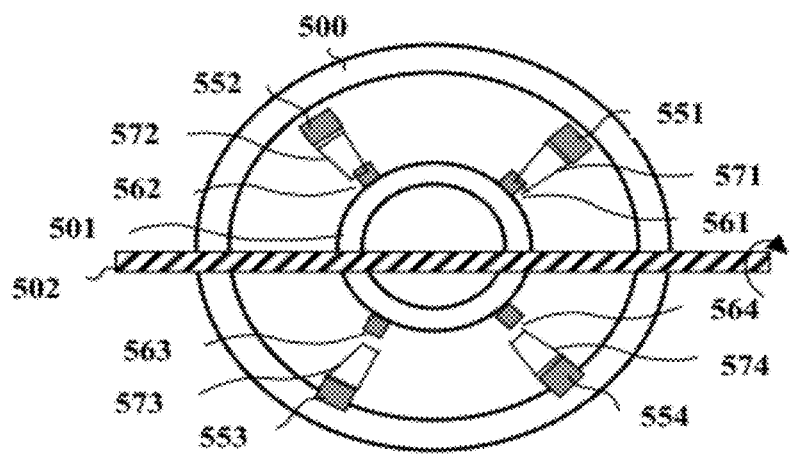
FIG. 5b illustrates a non-dimensionally scaled cross-sectional view of a small ball structure disposed within a bigger ball moving around the same rotational shaft by accommodating a second configuration magnetic and generator coil arrays according to an embodiment of the present invention.

Reference is now made to FIG. 5b, a cross sectional view of a generator employing a ball structure variation, differing from the one of FIG. 5a by incorporating larger magnets on the inner surface of ball 500, smaller magnets on the outer surface of ball 501 and conically shaped generator coils. The embodiment incorporates an outer ball 500 and an inner ball 501. The Magnets 551, 552, 553 and 554, which are affixed to the inner surface of ball 500, represent an array of magnets on the entire inner surface of ball 500. The Magnets 561, 562, 563 and 564, which are affixed to the outer surface of ball 501 within the volume of ball 500, likewise represent an array of magnets on the entire outer surface of ball 501. Each magnet on the inner surface of ball 500 mates a corresponding magnet on the outer surface of ball 501 and produces a conically shaped powerful and uniform magnetic field. A non-magnetic material covering inner surface of ball 400 and outer surface of ball 501 isolate the plurality of magnetic fields from each other and minimize losses caused by magnetic field leakage. Generator coils 571, 572, 573 and 574 are mounted inside ball 500 and external to ball 501. Each generator coil has the size and the shape of the magnetic fields created inside that volume. The number of coils equals the number of matching magnetic pairs and they are arranged radialy like the magnetic fields created between the matching magnetic pairs. The magnetic flux applied to the generator coils is varying when ball 500 and ball 501 rotate around shaft 502. Consequently a plurality of magnetic fields, cross the stationary array of generator coils and voltage is generated in each of the coils. Ball 500 and ball which have low magnetic field losses are contacting shaft 502 which is made of iron or another low magnetic loss material are used together to close the magnetic field loop. A low magnetic field loss is also incorporated by small air gaps between each generator coil and the pair of magnets. The configuration accommodates high power generation efficiency due to low losses along with high power density due to effective utilization of the generator volume.

Figure 5C:
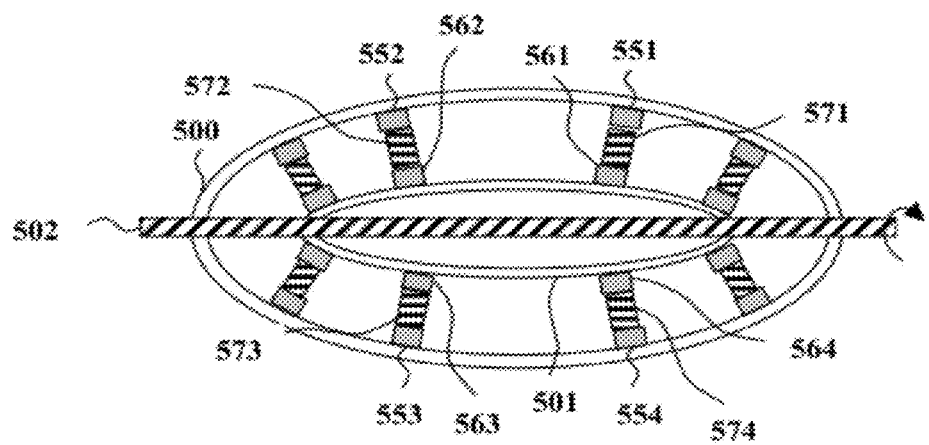
FIG. 5c illustrates a non-dimensionally scaled cross-sectional view of a small ellipsoid structure disposed within a bigger ellipsoid moving around the same rotational shaft according to an embodiment of the present invention.

Reference is now made to FIG. 5c a cross sectional view of a generator embodiment employing an ellipsoid structure configuration. The array of magnets, are affixed to bigger surface 500 and inner surface 501 and the matching magnetic pairs and the fixed generator coils are arranged in the volume enclosed by surfaces 500 and 501. Excluding the ellipsoid shape, this embodiment it is structured and operating similarly to the ball structure embodiment of FIG. 5a and the components of FIG. 5c are designated by the same numerals as the equivalent components of FIG. 5a.

Figure 6:
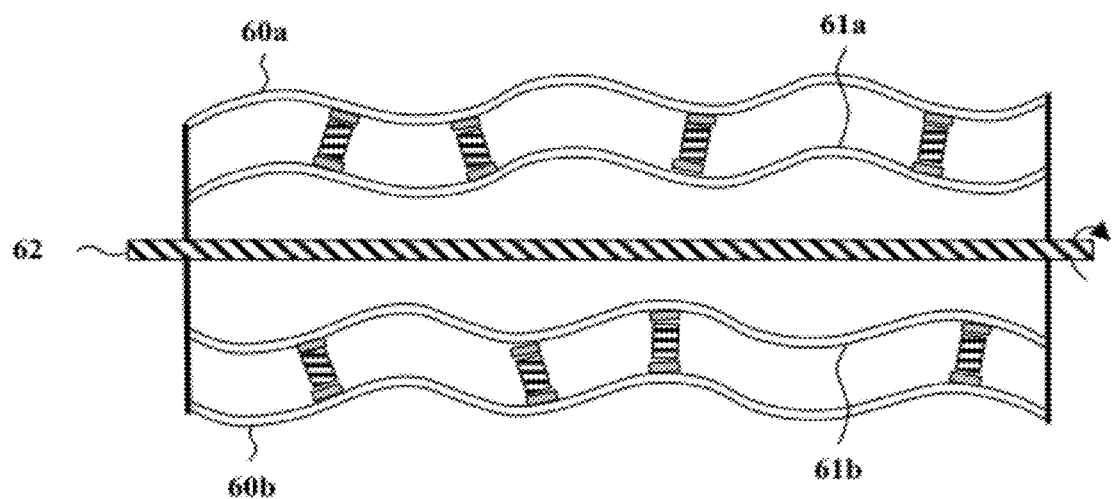
FIG. 6 illustrates a non-dimensionally scaled cross-sectional view of a small arbitrarily shaped structure disposed within a bigger structure having parallel surfaces rotating around the same rotational shaft according to an embodiment of the present invention.

Reference is now made to FIG. 6 a cross sectional view of a generator embodiment having waveform shaped surfaces for affixing magnets. External surface 60a adjacent to surface 61a have pairs of magnets affixed to them facing each other and generator coils placed in the volumes of the matching magnetic pairs. The arrangement of magnets arrays and coils follow the principles of magnets and generator coils of the preceding embodiments. Likewise is the arrangement of magnets arrays on surfaces 60b and 61b. Surfaces 60a, 60b, 61a and 61b are affixed to a rotating shaft 62 and are rotating with the shaft.

It will be appreciated that the formerly described generator embodiments may be varied in many ways including the magnets, the surfaces and the arrangement of magnets arrays on the surfaces within the limits of the disclosed invention.

It should also be appreciated that the above described description of methods and apparatus are to be interpreted as including apparatus for carrying out the methods, and methods of using the apparatus, and computer software for implementing the various automated control methods on a general purpose or specialized computer system, of any type as well known to a person or ordinary skill, and which need not be described in detail herein for enabling a person of ordinary skill to practice the invention, since such a person is well versed in industrial and control computers, their programming, and integration into an operating system.

For the main embodiments of the invention, the particular selection of type and model is not critical, though where specifically identified, this may be relevant. The present invention has been described using detailed descriptions of embodiments thereof that are provided by way of example and are not intended to limit the scope of the invention. No limitation, in general, or by way of words such as "may", "should", "preferably", "must", or other term denoting a degree of importance or motivation, should be considered as a limitation on the scope of the claims or their equivalents unless expressly present in such claim as a literal limitation on its scope. It should be understood that features and steps described with respect to one embodiment may be used with other embodiments and that not all embodiments of the invention have all of the features and/or steps shown in a particular figure or described with respect to one of the embodiments. That is, the disclosure should be considered complete from combinatorial point of view, with each embodiment of each element considered disclosed in conjunction with each other embodiment of each element (and indeed in various combinations of compatible implementations of variations in the same element). Variations of embodiments described will occur to persons of the art. Furthermore, the terms "comprise," "include," "have" and their conjugates, shall mean, when used in the claims, "including but not necessarily limited to." Each element present in the claims in the singular shall mean one or more element as claimed, and when an option is provided for one or more of a group, it shall be interpreted to mean that the claim requires only one member selected from the various options, and shall not require one of each option. The abstract shall not be interpreted as limiting on the scope of the application or claims.

It is noted that some of the above described embodiments may describe the best mode contemplated by the inventors and therefore may include structure, acts or details of structures and acts that may not be essential to the invention and which are described as examples. Structure and acts described herein are replaceable by equivalents performing the same function, even if the structure or acts are different, as known in the art. Therefore, the scope of the invention is limited only by the elements and limitations as used in the claims.

The invention claimed is:

1. An electrical power generator adapted to increase both the (i) power generation efficiency; and, (ii) electrical power density; wherein said electrical power generator comprising:
 (i) a rotating shaft;
 (ii) a plurality of spaced apart disk surfaces affixed to said rotating shaft; each of said disk surfaces is coupled to an array of magnets arranged on a spiraled line extending from the center of the disk surface to the edge of the disk surface, wherein the magnets in each array are magnetically insulated from each other, and wherein all arrays have equal number and same arrangement of magnets so as to create a plurality of distinct magnetic fields between any two adjacent disk surfaces; and (iii) a plurality of stationary supports located between said any two adjacent disk surfaces, each of said stationary supports sustains an array of generator coils having a number of generator coils equal to the number of said distinct magnetic fields; said generator coils have size and shape that fits the size and shape of said magnetic fields;

wherein upon rotation of said rotating shaft, each of said array of magnets rotates around said generator coils such that a time varying magnetic flux is provided and electrical power is generated in each of said generator coils.

2. The electrical power generator according to claim 1, wherein at least one of the following is being held true (a) the shape of said magnets is selected from the group consisting of circular shape and polygonal shape; (b) said magnets are magnetic field sources made of a rare earth material selected from the group consisting of samarium and neodymium; (c) said magnets are iron parts.

3. The electrical power generator according to claim 1, wherein magnets facing each other on adjacent disk surfaces have opposite magnetic poles, same magnetic poles, or any combination thereof.

4. The electrical power generator according to claim 1, wherein at least one of the following is being held true (a) said coils comprise several conductor winding on a ferromagnetic material core; (b) said electrical power generator is configured so as to minimize air gaps between said magnets and said coils and hence to reduce losses; (c) said disk surfaces are contacting said rotating shaft made of iron to provide a low loss medium path for the closing magnetic fields; (d) all the magnets on a disk have the same magnetic pole orientation; (e) have opposite pole orientation for creating a magnetic field between the top surface of top disk and bottom surface of bottom disk contact the iron walls of the generator package to provide a low loss medium path to the magnetic field.

5. The electrical power generator according to claim 1, wherein magnets facing each other on two adjacent surfaces are equal in size and said generator coils are shaped cylindrically as the magnetic fields.

\* \* \* \* \*